(12) United States Patent  (10) Patent No.: US 9,052,865 B2
Sun et al.  (45) Date of Patent: Jun. 9, 2015

(54) CONTROL METHOD FOR IMAGE DISPLAYING AND DISPLAY SYSTEM USING THE SAME

(71) Applicant: AU OPTRONICS CORP., Hsinchu (TW)

(72) Inventors: Yi-Lin Sun, Hsin-Chu (TW); Shih-Lun Lai, Hsin-Chu (TW); Yung-Sheng Tsai, Hsin-Chu (TW); Jen-Lang Tung, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 221 days.

(21) Appl. No.: 13/706,447

(22) Filed: Dec. 6, 2012

(65) Prior Publication Data

US 2014/0022145 A1  Jan. 23, 2014

(30) Foreign Application Priority Data

Jul. 20, 2012  (TW) .............................. 101126364 A

(51) Int. Cl.
*G09G 5/00* (2006.01)
*G06F 3/14* (2006.01)
*H04N 13/04* (2006.01)

(52) U.S. Cl.
CPC .......... *G06F 3/1423* (2013.01); *G09G 2354/00* (2013.01); *G09G 2356/00* (2013.01); *H04N13/0409* (2013.01); *H04N 13/0438* (2013.01); *H04N 13/0468* (2013.01); *H04N 2013/0465* (2013.01)

(58) Field of Classification Search
CPC ............. G06F 3/1423; G09G 2354/00; G09G 2356/00; H04N 13/0409; H04N 13/0438; H04N 13/0468; H04N 2013/0465
USPC ........... 345/87–102, 1.3, 1.5, 7, 8, 32, 59, 76, 345/156–184, 690–697, 204–214, 419
See application file for complete search history.

(56) References Cited

U.S. PATENT DOCUMENTS

| 8,018,579 B1 | 9/2011 | Krah |
| 2007/0164659 A1 | 7/2007 | Lee et al. |
| 2008/0088755 A1 | 4/2008 | Kwan |
| 2010/0277439 A1 | 11/2010 | Charlier et al. |
| 2011/0263339 A1 | 10/2011 | Cole et al. |

FOREIGN PATENT DOCUMENTS

| CN | 102402349 A | 4/2012 |
| TW | M275008 | 9/2005 |
| TW | 201023952 | 7/2010 |

OTHER PUBLICATIONS

Iwabuchi et al., "LimpiDual Touch (2008)", "http://www.youtube.com/watch?v=W52p0VpBDpU", Uploaded by NaemuraLab on Oct. 18, 2011.
www.rvn.com.tw, "http://www.rvn.com.tw/?www=info&info=view&view=44923", Jul. 25, 2011, Taiwan.

*Primary Examiner* — Kumar Patel
*Assistant Examiner* — Insa Sadio
(74) *Attorney, Agent, or Firm* — WPAT, PC; Justin King

(57) ABSTRACT

A control method for image displaying applicable for use to a dual-side transparent display. The control method includes the following operations each required to be executed at least one time in a display period. The operations are: providing a left-eye signal of an image displayed on a first display surface of the dual-side transparent display, to a first side thereof; providing a right-eye signal of an image displayed on the first display surface of the dual-side transparent display, to the first side thereof; providing a left-eye signal of an image displayed on a second display surface of the dual-side transparent display, to a second side thereof; providing a right-eye signal of an image displayed on the second display surface of the dual-side transparent display, to the second side thereof; and configuring the dual-side transparent display to present a transparent state. A display system is also provided.

8 Claims, 10 Drawing Sheets

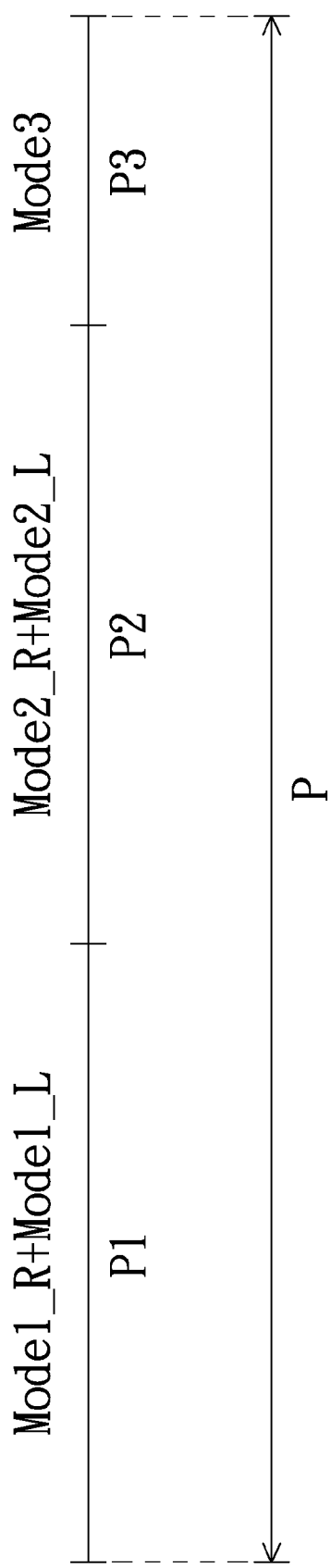
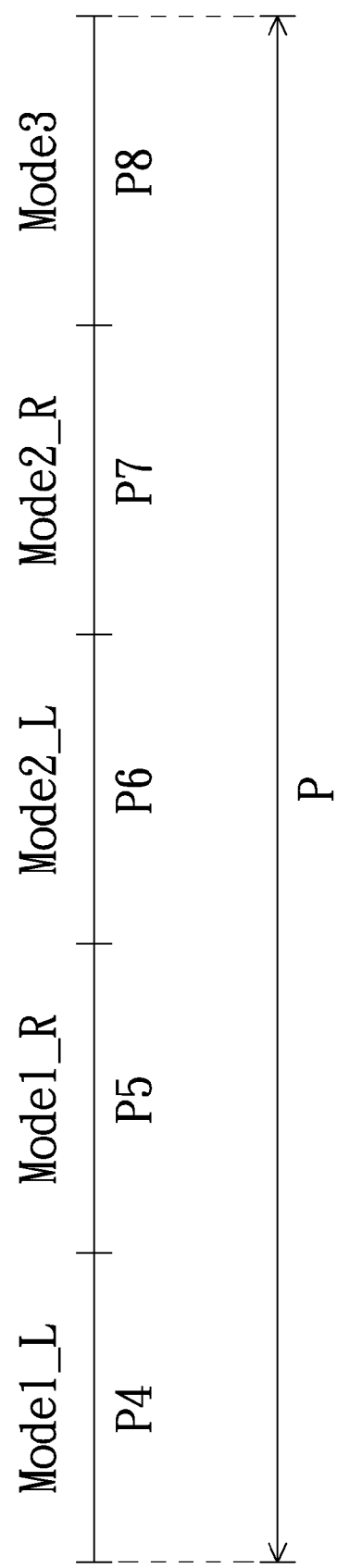

CONTROL METHOD FOR IMAGE DISPLAYING AND DISPLAY SYSTEM USING THE SAME

TECHNICAL FIELD

The present disclosure relates to a control method for image displaying and a display system using the same, and more particularly to a control method for image displaying and a display system using the same allowing users located two opposite sides watching different images according to a specific period sequence.

BACKGROUND

To many people, game consoles play an important role with their growing-up periods. Today, the game consoles have been developed from the earliest handheld game consoles as well as the large game machines to the game consoles integrated with television (TV) sets, so called TV console platforms. In addition, with the development of computer, the game console platform may be also combined with computers. However, most of the operation interfaces of the game consoles are relied on some input devices, such as keyboards or joysticks. Thus, players may not feel so real and excited while playing the game consoles through the conventional interactive means.

With the development of semiconductor and optoelectronic technology, today's game console platform allows players to use their body movements as a mean to operate the game console. Through this interactive manner, players can operate game consoles more realistically. FIG. 1 is a schematic view illustrating two players playing with a game console platform through their body movements. As shown, the game console platform includes a game console host 100 and a tracing system; wherein the tracing system includes a position tracing member 102 and handheld tracing members 104, 106.

The game console host 100 is connected to a display 108 and the tracing system. Generally, the position tracing member 102 is disposed on the display 108 and is equipped with a linear light source (not shown). In contrast, the two handheld tracing members 104, 106 are held by two players 110, 112, respectively, and each are configured to receive the light emitted from the linear light source of the position tracing member 102. Specifically, the handheld tracing members 104, 106 each output detection data to the game console host 100 in response to the detection of the light emitted from the linear light source of the position tracing member 102. Thus, the game console host 100 can calculate the physical movements of the players 110, 112 according to the received detection data.

Alternatively, the position tracing member 102 may be equipped with an image capture unit (not shown), which is, for example, a charge-coupled component (CCD). Accordingly, the handheld tracing members 104, 106 each are equipped with a point light source. Thus, through detecting the light emitted from the point light sources of the handheld tracing members 104, 106 by the equipped image capture unit, the position tracing member 102 can output the corresponding detection data to the game console host 100 for the calculation of the body movements of the players 110, 112.

Additionally, in some game console platforms, the handheld tracing members 104, 106 may be omitted in the tracing system; and the position tracing member 102 is configured to directly capture the body movements of the players 110, 112 through the equipped the image capture unit thereof, and then output the corresponding detection data to the game console host 100 for the calculation of the body movements of the players 110, 112.

The game console host 100 is configured to, after receiving the detection data of the body movements of the player 110, 112, output image data to the display 108 for displaying the corresponding game image thereon. However, the two players 110, 112 are required to be located on the same side of the display 108 for the game playing.

SUMMARY

The present disclosure provides a control method of a dual-side transparent display, and two players can play the same game on two opposite sides of the dual-side transparent display.

The present disclosure also provides display system capable of displaying images according to a specific period sequence on two opposite sides of a display thereof; thus, two players can play the same game at the same time on two opposite sides of the display.

An embodiment of the disclosure provides control method for image displaying applicable for use to a dual-side transparent display. The control method includes the following operations each required to be executed at least one time in a display period. The operations are: providing a left-eye signal of an image, currently being displayed on a first display surface of the dual-side transparent display, to a first side of the dual-side transparent display; providing a right-eye signal of an image, currently being displayed on the first display surface of the dual-side transparent display, to the first side of the dual-side transparent display; providing a left-eye signal of an image, currently being displayed on a second display surface of the dual-side transparent display, to a second side of the dual-side transparent display; providing a right-eye signal of an image, currently being displayed on the second display surface of the dual-side transparent display, to the second side of the dual-side transparent display; and configuring the first and second display surfaces not to display images and thereby controlling the dual-side transparent display to present a transparent state.

Another embodiment of the disclosure provides a display system, which includes a transparent display, a first display control module and a second display control module. The transparent display has a first display surface and a second display surface. The first display control module is disposed on the first display surface. The second display control module is disposed on the second display surface, and the transparent display is disposed between the first and second display control modules. The transparent display, the first display control module and the second display module corporately execute the following operations at least one time in a display period: the first display control module and the transparent display generating a first three-dimensional image; the second display control module and the transparent display generating a second three-dimensional image; and the first display surface and the second display surface configured not to display images and thereby controlling the transparent display to present a transparent state.

In summary, through providing, according to a specific sub-period sequence, three-dimensional images on two opposite sides of the dual-side transparent display according to the present disclosure, players can enjoy the same game on two sides of the display apparatus at the same time and consequently have a more real and exciting playing experience.

BRIEF DESCRIPTION OF THE DRAWINGS

The present disclosure will become more readily apparent to those ordinarily skilled in the art after reviewing the following detailed description and accompanying drawings, in which:

FIG. 3A is a schematic view illustrating a period sequence of a control method for an image displaying in accordance with the first embodiment of the present disclosure;

FIG. 3B is a schematic view illustrating a period sequence of a control method for an image displaying in accordance with the second embodiment of the present disclosure;

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
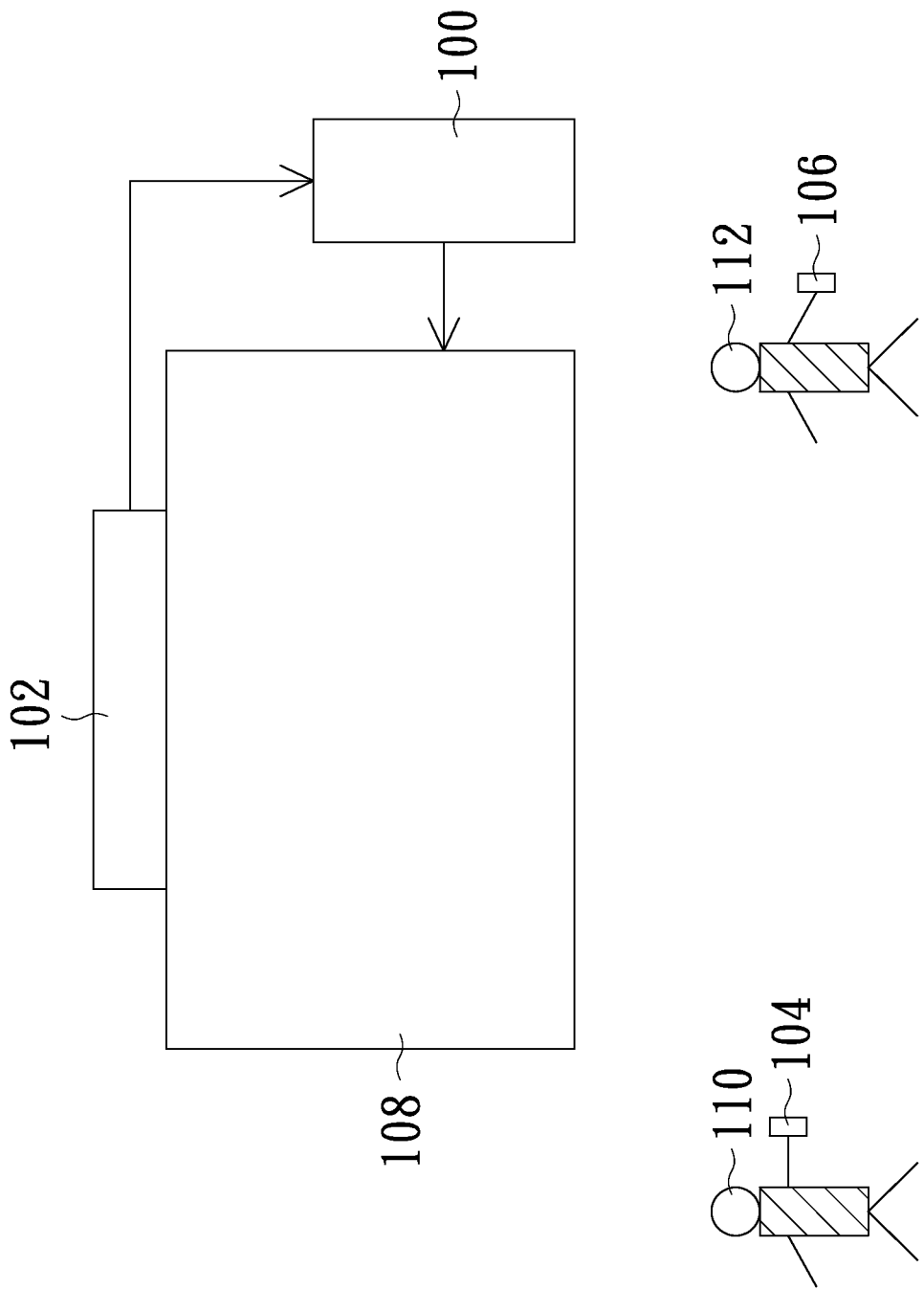
FIG. 1 is a schematic view illustrating two players playing with a game console platform through their body movements.
Figure 2:
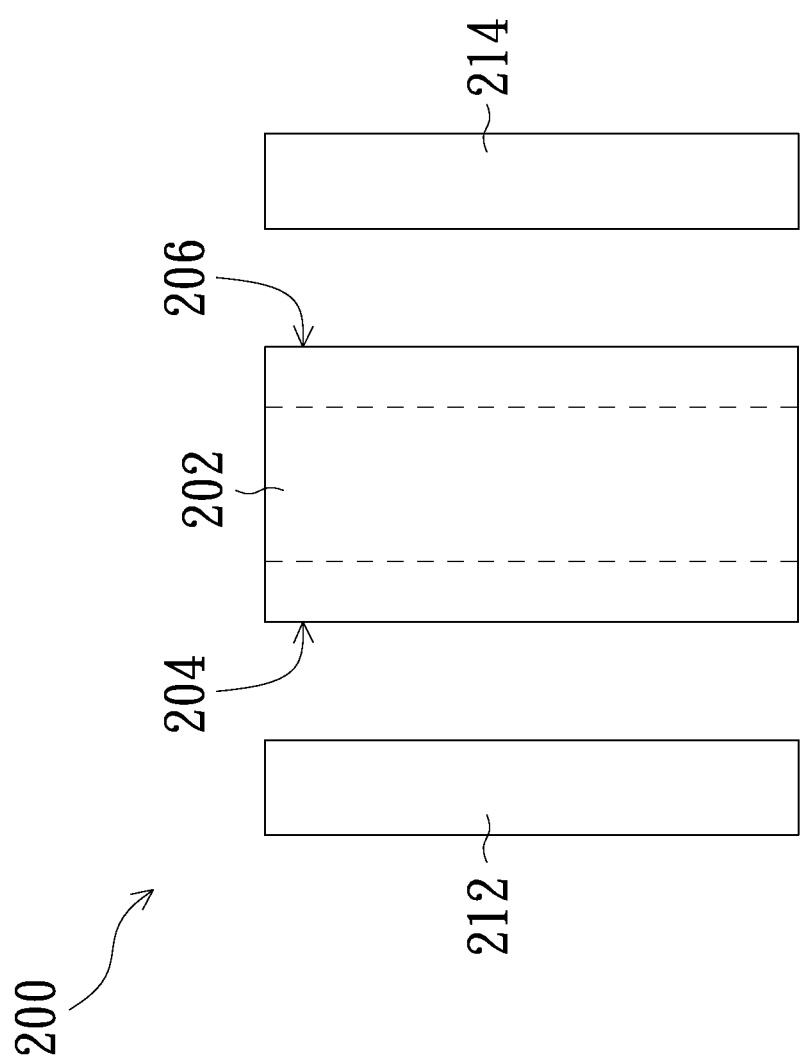
FIG. 2 is a schematic view of a display system in accordance with an embodiment of the present disclosure.

FIG. 2 is a schematic view of a display system in accordance with an embodiment of the present disclosure. As shown, the display system 200 in this embodiment includes a dual-side transparent display 202 and display control modules 212, 214. The dual-side transparent display 202 includes a transparent substrate and two display surfaces 204, 206; wherein the display surfaces 204, 206 are disposed on two opposite sides of the transparent display 202, respectively. The dual-side transparent display 202 presents a transparent state when neither of the display surfaces 204, 206 display images. In this embodiment, the dual-side transparent display 202 is assembled with a side-entry type backlight module and two liquid crystal display (LCD) modules; wherein the side-entry type backlight module is disposed between the two LCD modules. In other words, the two display surfaces 204, 206 of the dual-side transparent display 202 each serve as a LCD module, and the two LCD modules corporately share one side-entry type backlight module; and the disclosure is not limited thereto. For example, the dual-side transparent display 202 still can have a dual-side displaying effect if is assembled with one transparent display module and one organic light emitting diode (LED) backlight module.

In the present embodiment, the display control modules 212, 214 are configured to switch the display mode of the display surfaces 204, 206, respectively; in other words, the display control modules 212, 214 are configured to turn on or off the display effects of the display surfaces 204, 206, respectively. In addition, the display control modules 212, 214 are further configured to convert two-dimensional images respectively being displayed on the display surfaces 204, 206 into three-dimensional images.

In this embodiment, particularly, the dual-side transparent display 202 as well as the display control module 212, 214 are configured to corporately execute the following operations at least one time in a display period P: the display control module 212 provides the left-eye signal of the image currently being displayed on the display surface 204; the display control module 212 provides the right-eye signal of the image currently being displayed on the display surface 204; the display control module 214 provides the left-eye signal of the image currently being displayed on the display surface 206; the display control module 214 provides the right-eye signal of the image currently being displayed on the display surface 206; and neither of the display surfaces 204, 206 display images and thereby configuring the dual-side transparent display 202 to present a transparent state.

In some embodiments, the display control modules 212, 214 each can include barrier elements or optical prism elements. In this embodiment, the operation of the dual-side transparent display 202 as well as the display control modules 212, 214 is illustrated in FIG. 3A. As shown, the display control module 212, in a sub-period P1 of a display period P, is configured to provide the right-eye signal (Mode1_R) and the left-eye signal (Mode1_L) of the image, currently being displayed on the display surface 204, to the first side of the dual-side transparent display 202. Likewise, the display control module 214, in a sub-period P2 of the display period P, is configured to provide the right-eye signal (Mode2_R) and the left-eye signal (Mode2_L) of the image, currently being displayed on the display surface 206, to the second side of the dual-side transparent display 202; wherein the sub-period P1 is followed by the sub-period P2. Moreover, the display surfaces 204, 206, in the last sub-period P3 of the display period P, are configured not to display images (Mode3) and thereby configuring the dual-side transparent display 202 to present a transparent state; wherein the sub-period P2 is followed by the last sub-period P3.

To get a more clear understanding of this embodiment, the operation of the dual-side transparent display 202 as well as the display control modules 212, 214 will be exemplified by two players playing tennis in the following description. Please refer to both FIGS. 2, 3A. A first player is located on the first side of the dual-side transparent display 202, and a second player is located on the second side of the dual-side transparent display 202; wherein the first and second sides are associated to the first and second display surfaces 204, 206 of the dual-side transparent display 202, respectively. In the sub-period P1, because the display control module 212 is configured to provide the right-eye signal (Mode1_R) and the left-eye signal (Mode1_L) of the image, currently being displayed on the display surface 204, to the first side of the dual-side transparent display 202, the first player can watch the image (specifically, a three-dimensional image) displayed on the first side of the dual-side transparent display 202 through the display control module 212. In other words, in the sub-period P1 the display control module 212 and the dual-side transparent display 202 corporately generate three-dimensional images (for example, images illustrating a tennis ball flying toward the first player) for the first player. Meanwhile in the sub-period P1, the display control module 214 is configured not to display the images currently being displayed on the display surface 206, or, the dual-side transparent display 202 directly controls the display surface 206 not to display images.

Afterwards in the sub-period P2, because the display control module 214 is configured to provide the right-eye signal (Mode2_R) and the left-eye signal (Mode2_L) of the image, currently being displayed on the display surface 206, to the second side of the dual-side transparent display 202, the second player can watch the image (specifically, a three-dimensional image) displayed on the second side of the dual-side transparent display 202 through the display control module 214. In other words, in the sub-period P2 the display control module 214 and the dual-side transparent display 202 corporately generate three-dimensional images (for example, images illustrating a tennis ball flying toward the second player in response to the first player hitting back the ball in the sub-period P1) for the second player. Likewise, meanwhile in the sub-period P2, the display control module 214 is configured not to display the images currently being displayed on the display surface 206, or, the dual-side transparent display 202 directly controls the display surface 206 not to display images.

Afterwards in the last sub-period P3, the display surfaces 204, 206 are configured not to display images, so the first and second players can see each other through the dual-side transparent display 202 in a transparent state; and accordingly the two players can have a more real and exciting playing experience. In this embodiment, the display period P is constituted by the three sub-periods P1, P2, and P3 in sequence; but the disclosure is not limited thereto. For example, in another embodiment the display period P may be constituted by the three sub-periods P2, P3 and P1 in sequence; and in still another embodiment, the display period P may be constituted by the four sub-periods P1, P3, P2 and P3 in sequence. Specifically, it is to be noted that the sub-periods P1, P2 and P3 each are required to occur one time or more in one display period P; and the sub-periods P1, P2 and P3 can have any arbitrary sequence. In addition, if a time interval has a plurality of display periods P, the display periods P in the time interval each have the same period time length and the same sub-period sequence.

In one display period P, the sub-periods P1, P2 and P3 may have the same time length, or, have different time lengths. In the case of the sub-periods P1, P2 and P3 having the same time length, the display time for each display content is not required to correspondingly change with the frame length; however, the averaged luminance unevenness issue may occur. Alternatively, in the case of the sub-periods P1, P2 and P3 having different time lengths, the displayed image can have a more even brightness due to the display brightness increasing with a decrease in the display time. In addition, because transparent displays have a relatively low penetration rate and are not easily penetrated by background light, the sub-period P3 is adjusted to have a specific time length and thereby players can have a three-dimensional image with brightness close or even equal to the background brightness. In this embodiment, the sum of time length of the sub-period(s) P3 is greater than that of the sub-period(s) P1 as well as the sub-period(s) P2 in one display period P.

For example, if the display period P is constituted by four sub-periods P1, P3, P2 and P3 in sequence, the sub-periods P1, P2 and P3 are configured to have the same time length so that the sum of time length of the two sub-periods P3 can have a value twice of that of the sub-period P1 as well as the sub-period P2 in one display period P; and of course the sum of time length of the two sub-periods P3 is greater than that of the sub-period P1 as well as the sub-period P2 in one display period P. However, it is understood that the modulation of the sum of time length of the sub-period(s) P3 relative to that of other sub-periods can be based on the brightness of the background and the display. In this embodiment, the sub-period P3 in one display period P is configured to a time length equal to or less than 1/30 sec so as to prevent the flicker issue from occurring.

Figure 5A:
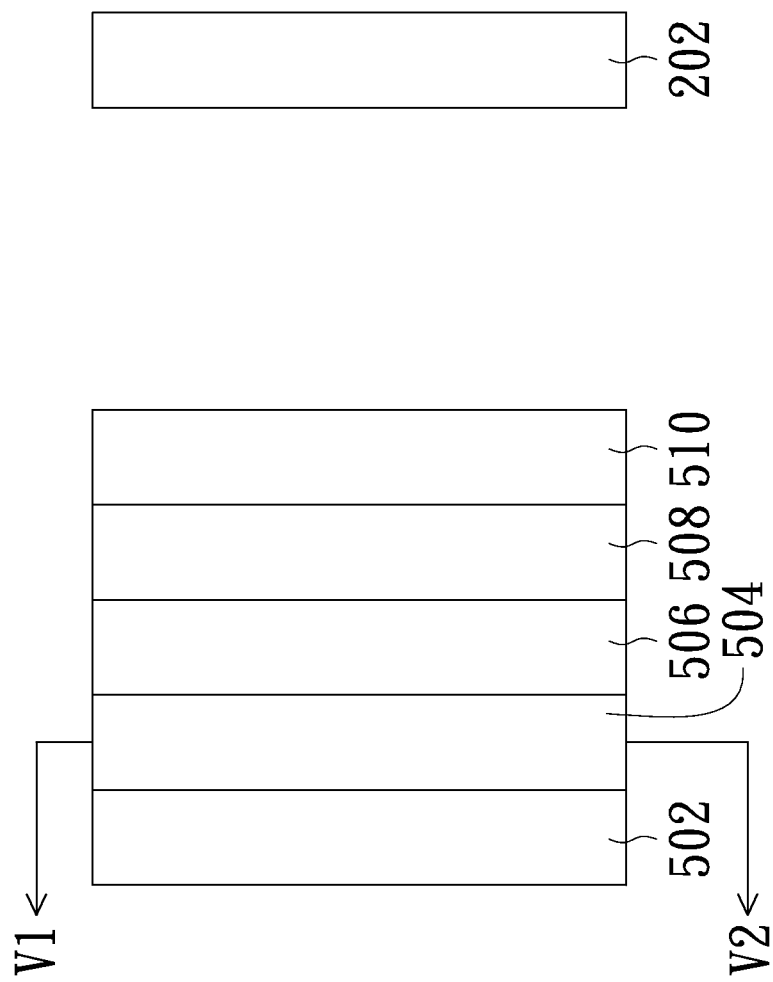
FIG. 5A is a schematic cross-sectional view of a barrier element in accordance with an embodiment of the present disclosure.

FIG. 5A is a schematic cross-sectional view of a barrier element in accordance with an embodiment of the present disclosure. Please refer to both FIGS. 2, 5A. The barrier element, used in the display control modules 212, 214, includes a polarizer layer 502, an electrode layer 504, a liquid crystal layer 506, an electrode layer 508 and a polarizer layer 510 in sequence. Specifically, the liquid crystal layer 506 is disposed between the electrode layers 504, 508; the polarizer layers 502, 510 are disposed on the electrode layers 504, 508, respectively; and the polarizer layer 510 is disposed to face the display surface 204 (or 206) of the dual-side transparent display 202.

Figure 5B:
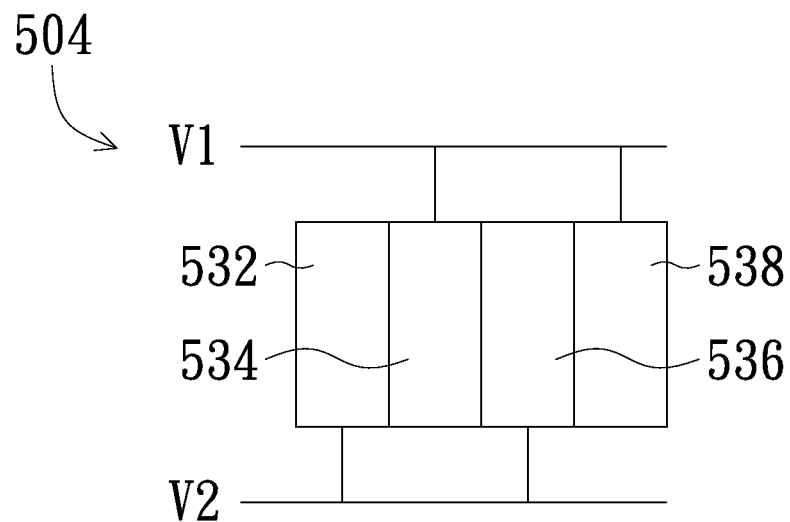
FIG. 5B is a schematic structural view of a electrode layer shown in FIG. 5A.
Figure 5C:
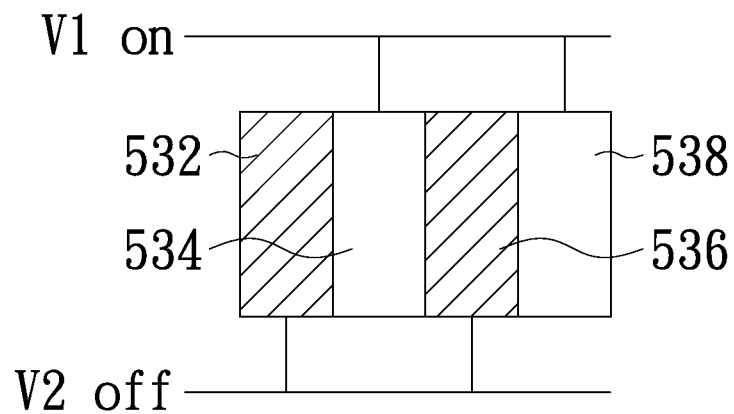
FIGS. 5C~5E are schematic views illustrating the structural variations of the electrode layer shown in FIG. 5B.
Figure 5D:
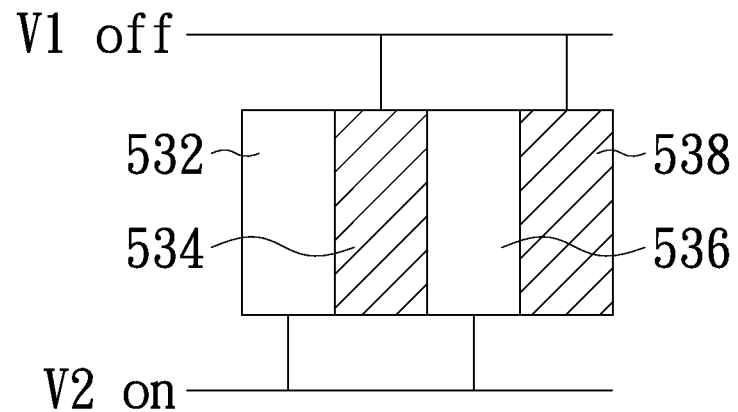
Figure 5E:
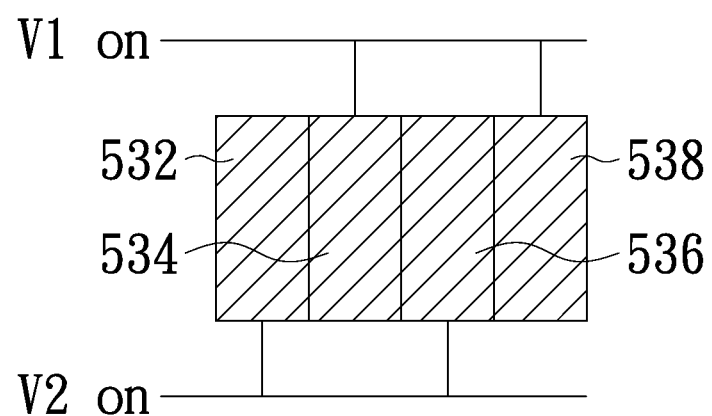

In this embodiment, the electrode layer 504 is constituted by a plurality of odd electrodes and even electrodes in parallel as illustrated in FIG. 5B. Specifically, it is to be noted that the electrode layer 504 in FIG. 5B is exemplified by being constituted by an odd electrode 532, an even electrode 534, an odd electrode 536 and an even electrode 538 in sequence; and the disclosure is not limited thereto. The even electrodes 534, 538 of the electrode layer 504 and the electrode layer 508 are coupled to a control voltage V1; and the odd electrodes 532, 536 of the electrode layer 504 and the electrode layer 508 are coupled to a control voltage V2. Specifically, when the control voltage V1 is on and the control voltage V2 is off as illustrated in FIG. 5C, the odd electrodes 532, 536 of the electrode layer 504 and the electrode layer 508 have a voltage difference therebetween and the voltage difference may lead the liquid crystal layer therebetween having a rotation; thus, the odd electrodes 532, 536 present a black state due to the liquid crystal layer rotation preventing light from emitting through the odd electrodes 532, 536. In addition, when the control voltage V1 is off and the odd electrodes 532, 536 of the electrode layer 504 and the electrode layer 508 have no voltage difference therebetween, the liquid crystal layer therebetween is back to an original state and the odd electrodes 532, 536 present a transparent state due to capable of being emitted through by light. Likewise, the some barrier elements of the even electrodes 534, 538 present a black state when the control voltage V1 is off and the control voltage V2 is on as illustrated in FIG. 5D; and present a transparent state when the control voltage V2 is off. Likewise, no light is capable of emitting through the barrier elements of the odd electrodes 532, 536 and even electrodes 534, 538 if the control voltages V1, V2 both are on as illustrated in FIG. 5E.

Figure 5F:
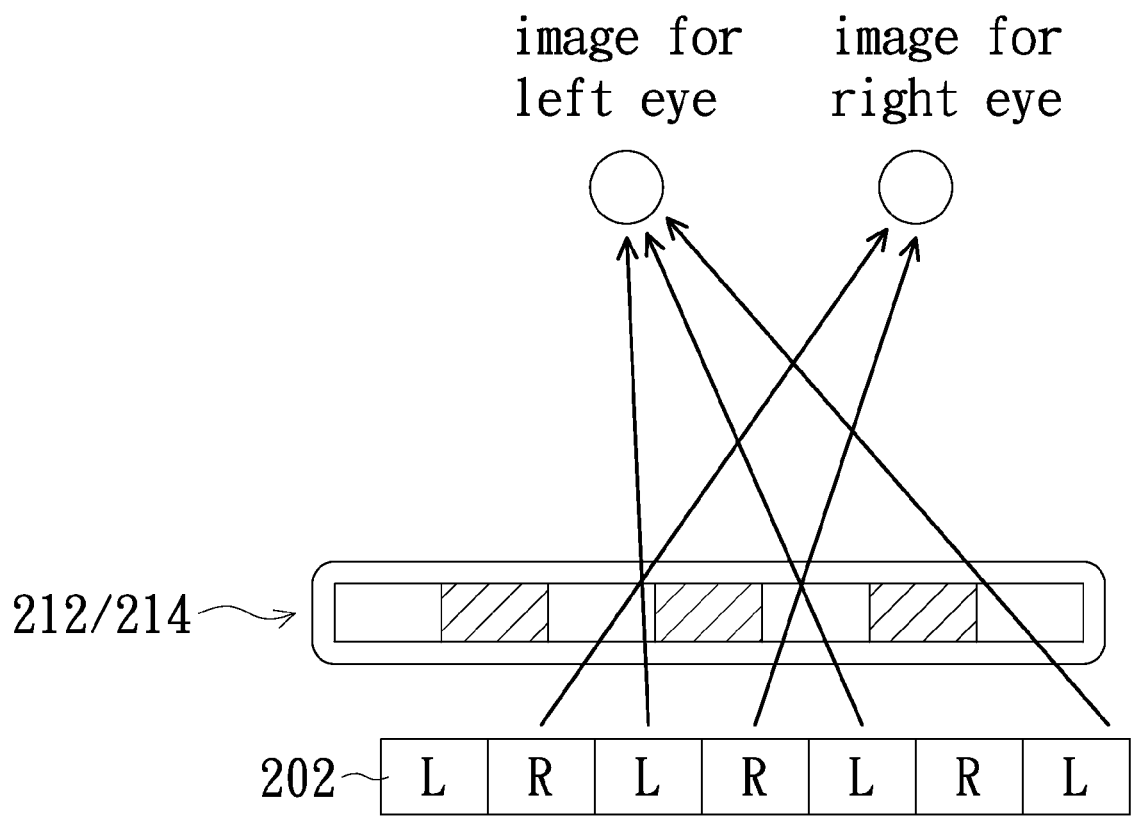
FIG. 5F is a schematic view illustrating the electrode structure shown in FIG. 5B and associated left-eye and right-eye signals.

In this embodiment, the barrier elements of the display control module 212 present a grating effect in the sub-period P1 and thereby converting the two-dimensional image currently being displayed on the display surface 204 to a left-eye image and a right-eye image (corporately forming a three-dimensional image) by the image splitting, as illustrated in FIG. 5F. Specifically, through turning on the control voltage V1 and turning off the control voltage V2, the barrier elements of the odd electrodes 532, 536 are configured to present a black state and the barrier elements of the even electrodes 534, 538 are configured to present a transparent state and thereby forming the grating, as illustrated in 5C. Afterwards, the barrier elements of the display control module 212 present a black state in the sub-period P2, and accordingly the image displayed on the display surface 204 cannot be seen by players. Specifically, the control voltages V1, V2 are on and thereby all the barrier elements present a black state, as illustrated in FIG. 5E. Afterwards, in the sub-period P3, the barrier elements of the display control module 212 are configured to present a transparent state, so the two players can see each other. Specifically, through turning off both the control voltages V1, V2, all the barrier elements can present a transparent state. Therefore, besides converting the two-dimensional image on the display surface 204 into a three-dimensional image, the barrier elements of the display control module 212 can further turn on or off the image displaying function of the display surface 204.

Likewise, in the sub-period P1, the barrier elements of the display control module 214 are configured to present a black state, so the image currently being displayed on the display surface 206 will be not seen by the displayer located on the second side of the dual-side transparent display 202. Afterwards, in the sub-period P2, the barrier elements of the display control module 214 are configured to present a grating effect thereby dividing the two-dimensional image on the display surface 206 to a left-eye image and a right-eye image (corporately forming a three-dimensional image). Afterwards, in the sub-period P3, the barrier elements of the display control module 214 are configured to present a transparent state, and accordingly the two players can see each other. The realization of the barrier element has been described; no any unnecessary detail is given here.

In some other embodiments, the display control modules 212, 214 each may further include shutter glasses. In these embodiments, the operation of the dual-side transparent display 202 as well as the display control modules 212, 214 is illustrated in FIG. 3B. As shown, the display control module 212, in a sub-period P4 of the display period P, is configured to provide the left-eye signal (Mode1_L) of the image, currently being displayed on the display surface 204, to the first side of the dual-side transparent display 202. Afterwards, the display control module 212, in a sub-period P5 of the display period P, is configured to provide the right-eye signal (Mode1_R) of the image, currently being displayed on the display surface 204, to the first side of the dual-side transparent display 202; wherein the sub-period P4 is followed by the sub-period P5. Therefore, the display control module 212 and the dual-side transparent display 202, in the display period P, corporately generate a three-dimensional image on the first side of the dual-side transparent display 202. In some embodiments, the display control module 214, in the sub-periods P4, P5, can be configured not to provide the image currently being displayed on the display surface 206; or, the dual-side transparent display 202, in the sub-periods P4, P5, directly controls the display surface 206 not to display images.

Likewise, the display control module 214, in a sub-period P6 of the display period P, is configured to provide the left-eye signal (Mode2_L) of the image, currently being displayed on the display surface 206, to the second side of the dual-side transparent display 202; wherein the sub-period P5 is followed by the sub-period P6. Afterwards, the display control module 214, in a sub-period P7 of the display period P, is configured to provide the right-eye signal (Mode2_R) of the image, currently being displayed on the display surface 206, to the second side of the dual-side transparent display 202; wherein the sub-period P6 is followed by the sub-period P7. Therefore, the display control module 214 and the dual-side transparent display 202, in the display period P, corporately generate a three-dimensional image on the second side of the dual-side transparent display 202. In some embodiments, the display control module 212, in the sub-periods P6, P7, can be configured not to provide the image currently being displayed on the display surface 204; or, the dual-side transparent display 202, in the sub-periods P6, P7, directly controls the display surface 204 not to display images.

Afterwards, the display surfaces 204, 206, in the last sub-period P8, are configured not to display images and thereby the dual-side transparent display 202 presenting a transparent state; wherein the sub-period P7 is followed by the last sub-period P8. In this embodiment, the display period P is constituted by the sub-periods P4, P5, P6, P7 and P8 in sequence; but the disclosure is not limited thereto. In addition, the sub-periods P4, P5, P6, P7 and P8 each are required to exist at least one time in one display period P; and the sub-periods P4, P5, P6, P7 and P8 can have an arbitrary sequence. In addition, if a time interval has a plurality of display periods P, the display periods P in the time interval each have the same period time length and the same sub-period sequence.

Likewise, in one display period P, the sub-periods P4, P5, P6, P7 and P8 may have the same time length, or, have different time lengths. Specifically, the sum of time length of the sub-period(s) P8 is greater than that of each of the sub-periods P4, P5, P6 and P7 in one display period P.

Figure 6:
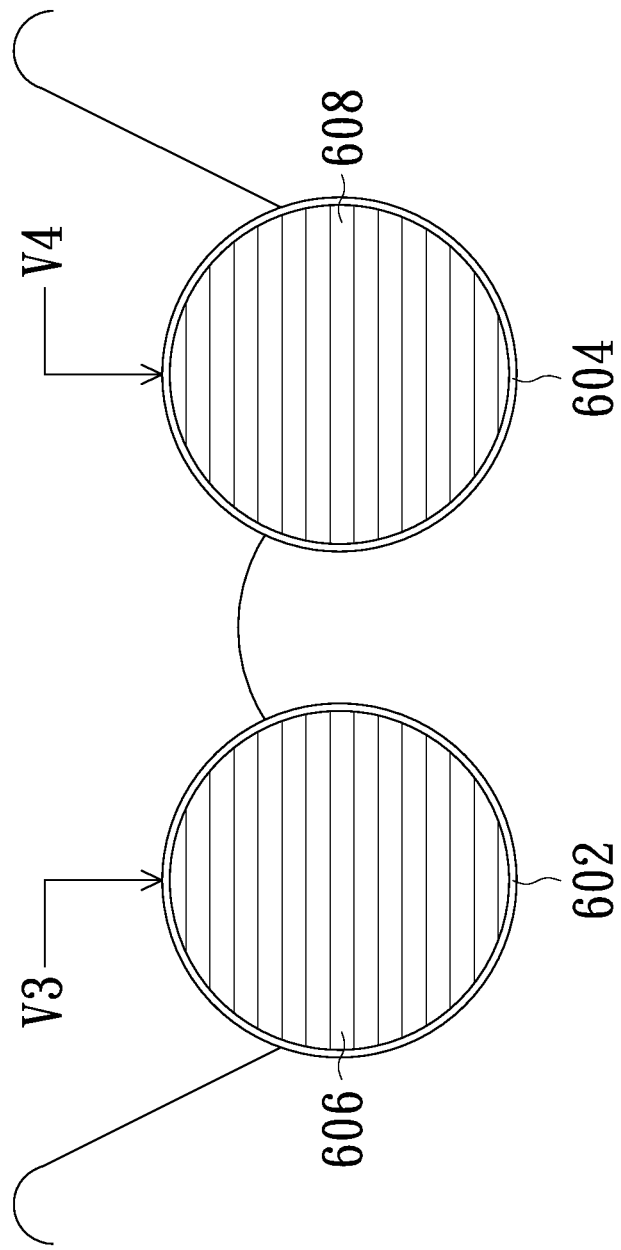
FIG. 6 is a schematic view of a pair of shutter glasses in accordance with an embodiment of the present disclosure.

FIG. 6 is a schematic view of a pair of shutter glasses in accordance with an embodiment of the present disclosure. Please refer to both FIGS. 2, 6. As shown, the pair of shutter glasses applied to the display control modules 212, 214 includes liquid crystal lenses 602, 604 controlled by control voltages V3, V4, respectively. In addition, the liquid crystal lenses 602, 604 are attached with polarizer films 606, 608, respectively. The shutter glasses, functioned as the display control module 212 (or 214), are configured to generate the three-dimensional image, derived from the image currently being displayed on the display surface 204 (or 206), to players. Specifically, through turning on or off the control voltage V3, V4, the left-eye and right-eye signals of the image currently being displayed on the display surface 204 (or 206) are provided.

For example, to make the shutter glasses provide the right-eye signal of the image currently being displayed on the display surface 204 (or 206), the control voltage V3 is configured to be turned off (i.e. the control voltage V3 is configured to the ground voltage), and accordingly the liquid crystal molecules in the liquid crystal lens 602 can have a changed polarization state by being rotated and, thereby allowing the light to pass through. For example, if the liquid crystal molecules are TN mode liquid crystals, the liquid crystal molecules, through turning off the control voltage, can have a changed polarization state by being maintained in rotating and thereby allowing light to pass through the mutually orthogonal polarizer film. Thus, the light from the display surface 204 (or 206) can emit to the player's eyes after passing through the liquid crystal lens 602. Alternatively, if the control voltage V4 is configured to be turned on (i.e. the control voltage V4 is configured to a non-ground voltage) the liquid crystal molecules in the liquid crystal lens 604 can have a no-changed polarization state by being vertical to the polarizer film, and accordingly the external light cannot pass through the liquid crystal lens 604. It is understood that the aforementioned operation process is also applied to the providing of the left-eye signal of the image currently being displayed on the display surface 204 (or 206); and no any unnecessary is given here.

In addition, to block the external light and make the shutter glasses not provide the image currently being displayed on the display surface 204 (or 206), the control voltages V3, V4 both are turned on and thereby maintaining the liquid crystal molecules in the liquid crystal lenses 602, 604 in an original state. Alternatively, when the dual-side transparent display 202 presents a transparent state, the control voltages V3, V4 both are turned off and thereby changing the polarization state of the liquid crystal molecules in the liquid crystal lenses 602, 604; thus, the two players can see each other through the shutter glasses 202 and the dual-side transparent display 202. Therefore, besides converting the two two-dimensional images on the display surfaces 204, 206 into a three-dimensional image, the shutter glasses of the display control modules 212, 214 can further turn on or off the image displaying function of the display surfaces 204, 206.

Figure 3C:
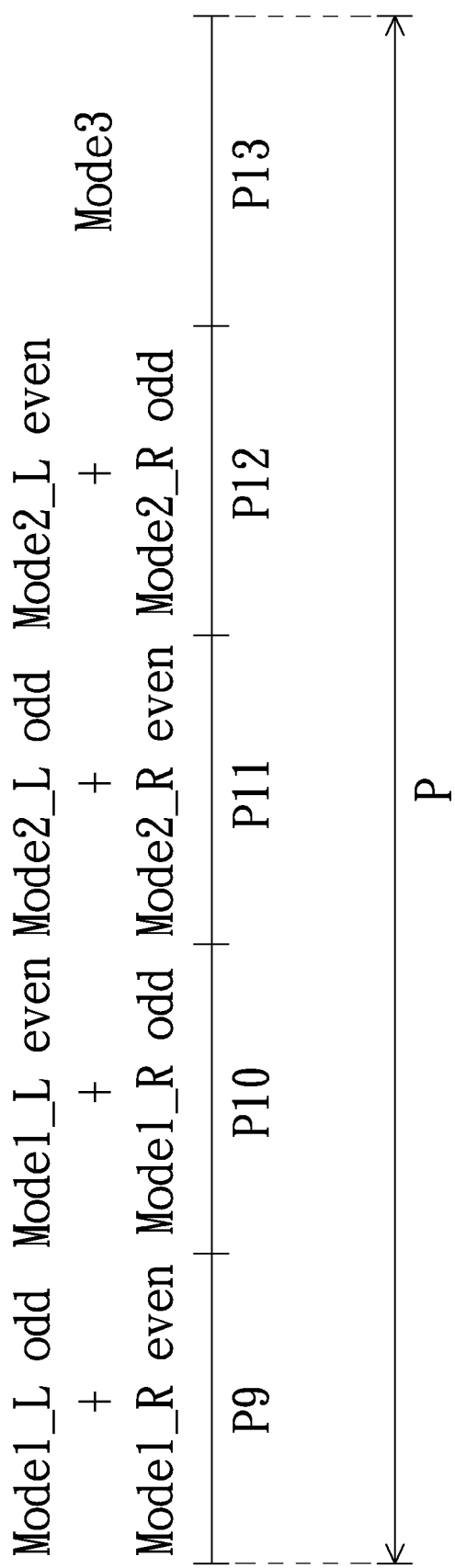
FIG. 3C is a schematic view illustrating a period sequence of a control method for an image displaying in accordance with the third embodiment of the present disclosure.

In some other embodiments, the display control modules 212, 214 each may further include at least one of the scanning barrier element, a scanning retarder element and shutter glasses. In these embodiments, the operation of the dual-side transparent display 202 as well as the display control modules 212, 214 is illustrated in FIG. 3C. As shown, the display control module 212, in a sub-period P9 of the display period P, is configured to provide the left-eye signal (Mode1_L odd) of odd-rowed pixels and the right-eye signal (Mode1_R even) of even-rowed pixels of the image, currently being displayed on the display surface 204, to the first side of the dual-side transparent display 202.

Afterwards, the display control module 212, in a sub-period P10 of the display period P, is configured to provide the left-eye signal (Mode1_L even) of even-rowed pixels and the right-eye signal (Mode1_R odd) of odd-rowed pixels of the image, currently being displayed on the display surface 204, to the first side of the dual-side transparent display 202; wherein the sub-period P9 is followed by the sub-period P10. Therefore, the display control module 212 and the dual-side transparent display 202, in the display period P, corporately generate a three-dimensional image on the first side of the dual-side transparent display 202. Likewise, the display control module 214, in the sub-periods P9, P10, can be configured not to provide the image currently being displayed on the display surface 206; or, the dual-side transparent display 202, in the sub-periods P9, P10, directly controls the display surface 206 not to display images.

Likewise, the display control module 214, in a sub-period P11 of the display period P, is configured to provide the left-eye signal (Mode2_L odd) of the odd-rowed pixels and the right-eye signal (Mode2_R even) of the even-rowed pixels of the image, currently being displayed on the display surface 206, to the second side of the dual-side transparent display 202; wherein the sub-period P10 is followed by the sub-period P11. Afterwards, the display control module 214, in a sub-period P12 of the display period P, is configured to provide the left-eye signal (Mode2_L even) of the even-rowed pixels and right-eye signal (Mode2_R odd) of the odd-rowed pixels of the image, currently being displayed on the display surface 206, to the second side of the dual-side transparent display 202; wherein the sub-period P11 is followed by the sub-period P12. Therefore, the display control module 214 and the dual-side transparent display 202, in the display period P, corporately generate a three-dimensional image on the second side of the dual-side transparent display 202. Likewise, the display control module 212, in the sub-periods P11, P12, can be configured not to provide the image currently being displayed on the display surface 204; or, the dual-side transparent display 202, in the sub-periods P11, P12, directly controls the display surface 204 not to display images.

Afterwards, the display surfaces 204, 206, in the last sub-period P13, are configured not to display images and thereby the dual-side transparent display 202 presenting a transparent state; wherein the sub-period P12 is followed by the last sub-period P13. In this embodiment, the display period P is constituted by the sub-periods P9, P10, P11, P12 and P13 in sequence; but the disclosure is not limited thereto. In addition, the sub-periods P9, P10, P11, P12 and P13 each are required to exist at least one time in one display period P; and the sub-periods P9, P10, P11, P12 and P13 can have an arbitrary sequence. In addition, if a time interval has a plurality of display periods P, the display periods P in the time interval each have the same period time length and the same sub-period sequence.

Likewise, in one display period P, the sub-periods P9, P10, P11, P12 and P13 may have the same time length, or, have different time lengths. Specifically, the sum of time length of the sub-period(s) P13 is greater than that of each of the sub-periods P9, P10, P11 and P12 in one display period P.

Figure 4:
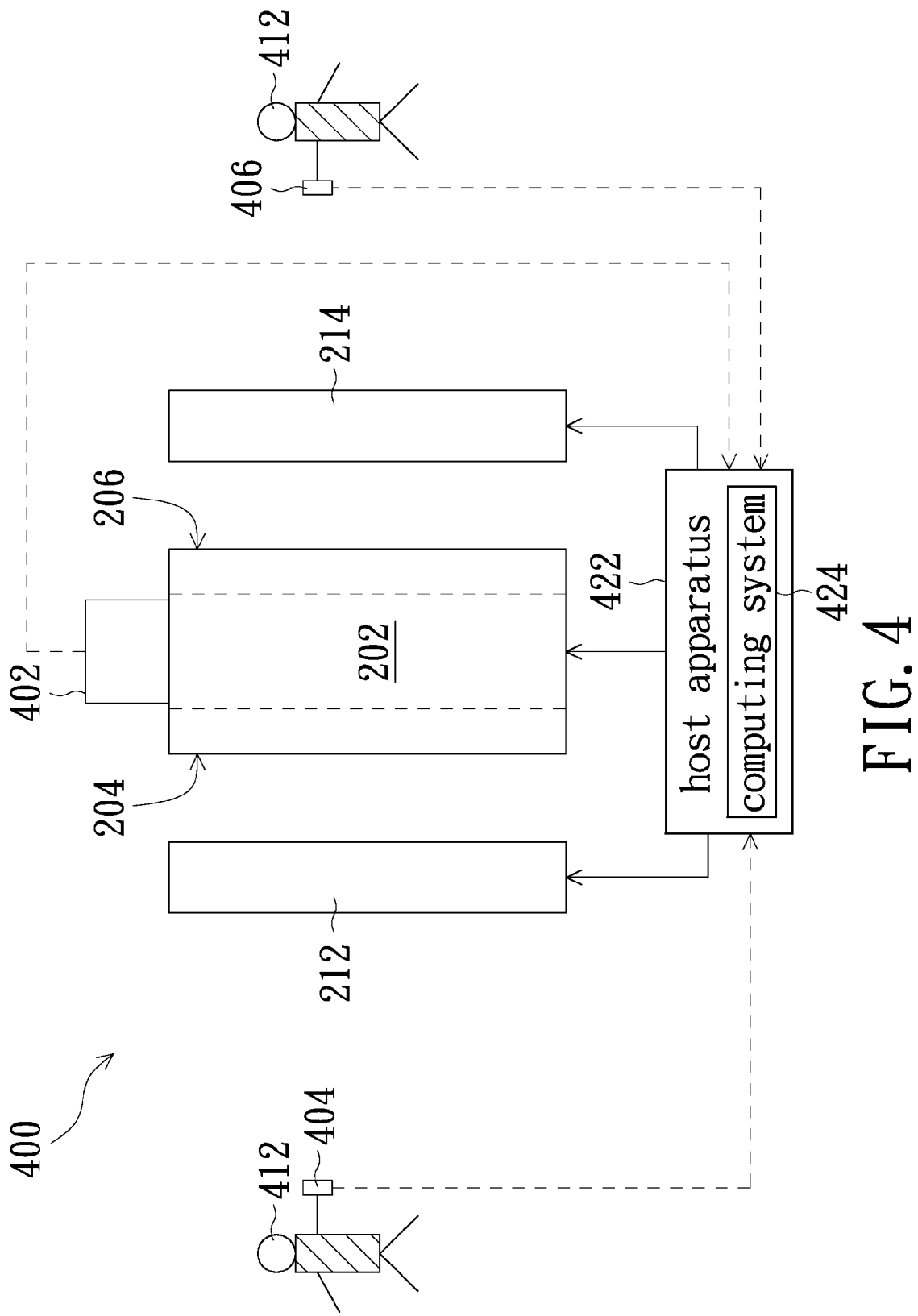
FIG. 4 is a schematic view of a display system in accordance with another embodiment of the present disclosure.

To those ordinarily skilled in the art, it is understood that the control method for image displaying according to the present disclosure is not limited to the aforementioned embodiments, FIG. 4 is a schematic view of a display system in accordance with another embodiment of the present disclosure. As shown, the display system 400 in this embodiment further, compared with the display system 200, includes a tracing system with at least one position tracing member 402. In some embodiments, the tracing system may further include a handheld tracing member 404 and/or a handheld tracing member 406. The position tracing member 402 is, for example, disposed on the dual-side transparent display 202 and equips with a linear light source or an image capture unit. In addition, the handheld tracing members 404, 406 are held by players 412, 414, respectively, and the handheld tracing members 404, 406 each can equip with at least one of a linear light source detector, a point light source, an accelerometer or a gyroscope. Through the tracking system, the sights, movements and positions of the players 412, 414 can be detected.

In addition, the display system 400 in the embodiment further includes a host apparatus 422, which is connected to the position tracing member 402, the handheld tracing members 404, 406, the dual-side transparent display 202 and the display control modules 212, 214 in a wire or wireless connection manner. In this embodiment, the host apparatus 422 includes a computing system 424 configured to calculate, through the tracing system, specific images in response to the current environment and transmit the image information to the dual-side transparent display 202 so as to display corresponding virtual images on the display surfaces 204, 206. In addition, the computing system 424 is further configured to calculate the positions, the three-dimensional image and the binocular disparity of the virtual images relative to the display surfaces 204, 206 according to the movements of the players 412, 414 detected by the tracing system.

In summary, through providing, according to a specific sub-period sequence, three-dimensional images on two opposite sides of the dual-side transparent display according to the present disclosure, players can enjoy the same game on two sides of the display apparatus at the same time and consequently have a more real and exciting playing experience.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method for image displaying applicable for use to a dual-side transparent display, comprising:
   executing the following operations at least one time in a display period:
   providing a left-eye signal of an image, currently being displayed on a first display surface of the dual-side transparent display, to a first side of the dual-side transparent display;
   providing a right-eye signal of an image, currently being displayed on the first display surface of the dual-side transparent display, to the first side of the dual-side transparent display;
   providing a left-eye signal of an image, currently being displayed on a second display surface of the dual-side transparent display, to a second side of the dual-side transparent display;
   providing a right-eye signal of an image, currently being displayed on the second display surface of the dual-side transparent display, to the second side of the dual-side transparent display; and
   configuring the first and second display surfaces not to display images and thereby controlling the dual-side transparent display to present a transparent state;
   wherein the dual-side transparent display is configured not to display images on the first side thereof if at least one of the left-eye and right-eye signals of an image currently being displayed is provided to the second side of the dual-side transparent display; wherein the dual-side transparent display is configured not to display images on the second side thereof if at least one of the left-eye and right-eye signals of an image currently being displayed is provided to the first side of the dual-side transparent display.

2. The control method according to claim 1, further comprising:
   simultaneously providing, in a first sub-period of the display period, the left-eye and right-eye signals of an image, currently being displayed on the first display surface, to the first side of the dual-side transparent display;
   simultaneously providing, in a second sub-period of the display period, the left-eye and right-eye signals of an image, currently being displayed on the second display surface, to the second side of the dual-side transparent display, wherein the first sub-period is followed by the second sub-period; and
   configuring the dual-side transparent display not to display images on both the first and second sides thereof in a last sub-period of the display period, wherein the second sub-period is followed by the last sub-period.

3. The control method according to claim 1, further comprising:
   providing the left-eye signal of an image, currently being displayed on the first display surface of the dual-side transparent display, to the first side of the dual-side transparent display in a first sub-period of the display period;
   providing the right-eye signal of an image, currently being displayed on the first display surface of the dual-side transparent display, to the first side of the dual-side transparent display in a second sub-period of the display period, wherein the first sub-period is followed by the second sub-period;
   providing the left-eye signal of an image, currently being displayed on the second display surface of the dual-side transparent display, to the second side of the dual-side transparent display in a third sub-period of the display period, wherein the second sub-period is followed by the third sub-period;
   providing the right-eye signal of an image, currently being displayed on the second display surface of the dual-side transparent display, to the second side of the dual-side transparent display in a fourth sub-period of the display period, wherein the third sub-period is followed by the fourth sub-period; and
   configuring the dual-side transparent display not to display images on both the first and second sides thereof in a last sub-period of the display period, wherein the fourth sub-period is followed by the last sub-period.

4. The control method according to claim 1, further comprising:
   providing the left-eye signal of odd-rowed pixels and the right-eye signal of even-rowed pixels of an image, currently being displayed on the first display surface of the dual-side transparent display, to the first side of the dual-side transparent display in a first sub-period of the display period;
   providing the left-eye signal of even-rowed pixels and the right-eye signal of odd-rowed pixels of an image, currently being displayed on the first display surface of the dual-side transparent display, to the first side of the dual-side transparent display in a second sub-period of the display period, wherein the first sub-period is followed by the second sub-period;
   providing the left-eye signal of odd-rowed pixels and the right-eye signal of even-rowed pixels of an image, currently being displayed on the second display surface of the dual-side transparent display, to the second side of the dual-side transparent display in a third sub-period of the display period, wherein the second sub-period is followed by the third sub-period;
   providing the left-eye signal of even-rowed pixels and the right-eye signal of odd-rowed pixels of an image, currently being displayed on the second display surface of the dual-side transparent display, to the second side of the dual-side transparent display in a fourth sub-period of the display period, wherein the third sub-period is followed by the fourth sub-period; and
   configuring the dual-side transparent display not to display images on both the first and second sides thereof in a last sub-period of the display period, wherein the fourth sub-period is followed by the last sub-period.

5. A display system, comprising:
   a transparent display having a first display surface and a second display surface;
   a first display control module disposed on the first display surface; and
   a second display control module disposed on the second display surface, and the transparent display being disposed between the first and second display control modules,
   wherein the transparent display, the first display control module and the second display module corporately execute the following operations at least one time in a display period:
   the first display control module and the transparent display generating a first three-dimensional image;
   the second display control module and the transparent display generating a second three-dimensional image; and the first display surface and the second display surface configured not to display images and thereby controlling the transparent display to present a transparent state;

wherein, when the first display control module and the transparent display generate the first three-dimensional image, the second display control module and the transparent display do not generate the second three-dimensional image, when the second display control module and the transparent display generate the second three-dimensional image, the first display control module and the transparent display do not generate the first three-dimensional image.

6. The display system according to claim 5, wherein the first and second display control modules each comprise a barrier element, an optical prism element or shutter glasses.

7. The display system according to claim 5, further comprising:
a tracing system configured to trace a movement of a user(s).

8. The display system according to claim 7, further comprising:
a computing system configured to calculate a position of the user(s) through the tracing system.

* * * * *